(12) United States Patent
Chari (10) Patent No.: US 8,942,317 B2
(45) Date of Patent: Jan. 27, 2015

(54) CARRIER OFFSET CORRECTION OF A RECEIVED SIGNAL

(75) Inventor: Sujai Chari, Burlingame, CA (US)

(73) Assignee: Imagination Technologies, LLC (GB)

(\*) Notice: Subject to any disclaimer, the term of this patent is extended or adjusted under 35 U.S.C. 154(b) by 283 days.

(21) Appl. No.: 13/543,481

(22) Filed: Jul. 6, 2012

(65) Prior Publication Data

US 2014/0010326 A1 Jan. 9, 2014

(51) Int. Cl.
  *H04L 27/00* (2006.01)
  *H04L 27/26* (2006.01)
  *H04L 7/04* (2006.01)

(52) U.S. Cl.
  CPC ........... *H04L 27/2657* (2013.01); *H04L 7/042* (2013.01)
  USPC ........... 375/326; 375/285; 375/316; 375/340; 375/343; 375/344; 375/354; 375/371; 375/375

(58) Field of Classification Search
  CPC ............ H04L 27/0014; H04L 27/0048; H04L 27/0065; H04L 27/2656; H04L 27/2657; H04L 27/2663; H04L 2027/003; H04L 2027/0095; H04L 7/042
  USPC ......... 375/285, 316, 326, 340, 343, 344, 354, 375/371, 375
  See application file for complete search history.

(56) References Cited

U.S. PATENT DOCUMENTS

| 7,298,787 | B2* | 11/2007 | Priotti .......................... 375/267 |
| 8,416,759 | B1* | 4/2013 | Narasimhan et al. ......... 370/344 |
| 2009/0080576 | A1 | 3/2009 | Xiang |
| 2009/0323515 | A1* | 12/2009 | Ishikura et al. ............... 370/210 |
| 2009/0323793 | A1 | 12/2009 | Chang et al. |
| 2010/0080114 | A1 | 4/2010 | Ratnam et al. |
| 2010/0135437 | A1* | 6/2010 | Lee et al. ...................... 375/324 |
| 2011/0007644 | A1 | 1/2011 | Walker |

\* cited by examiner

*Primary Examiner* — Leon Flores
(74) *Attorney, Agent, or Firm* — Brian R. Short (57) ABSTRACT

Apparatuses, methods and systems for mitigating carrier offset of a received signal are disclosed. One embodiment of a receiver includes a receiver chain operative to receive a communication signal from a desired transmitter, and a controller operative to determine a carrier offset correction based on prior reception of communication signals from the desired transmitter. The receiver chain is operative to generate a carrier offset corrected received signal by applying the carrier offset correction to the received communication signal, and a correlation processor operative to correlate the carrier offset corrected received communication signal with a known sequence.

26 Claims, 5 Drawing Sheets

CARRIER OFFSET CORRECTION OF A RECEIVED SIGNAL

FIELD OF THE DESCRIBED EMBODIMENTS

The described embodiments relate generally to wireless communications. More particularly, the described embodiments relate to systems, methods and apparatuses for carrier offset correction of a received signal.

BACKGROUND

Receivers in communication systems often must receive and detect signals of interest in the presence of various impairments. If the impairments are not compensated by the receiver in some manner, the performance of the receiver may be degraded often precluding proper demodulation/decoding of the signal of interest. Examples of impairments include carrier offset, timing offset, thermal noise, I/Q imbalance, interference, DC offset, channel dispersion.

Prior solutions estimate these impairments during some portion of the data being received and apply mitigation techniques to minimize the performance degradation. Some disadvantages of estimating these impairments during reception of the data include the estimation being noisy due to insufficient data being used to derive estimate, the estimation occurs after processing of certain receiver functions such as synchronization thereby degrading the accuracy of those functions, and increased latency of processing the received data due to the impairment estimation that must occur prior to processing of various receiver function It is desirable to have methods apparatuses, and systems for overcoming the above-described impairments, including carrier offset and timing offset impairments.

SUMMARY

An embodiment includes a receiver. The receiver includes a receiver chain operative to receive a communication signal from a desired transmitter, and a controller operative to determine a carrier offset correction based on prior reception of communication signals from the desired transmitter. The receiver chain is operative to generate a carrier offset corrected received signal by applying the carrier offset correction to the received communication signal, and a correlation processor is operative to correlate the carrier offset corrected received communication signal with a known sequence.

Another embodiment includes a method of receiving a wireless signal. The method includes receiving a communication signal from a desired transmitter, determining a carrier offset correction based on prior reception of communication signals from the desired transmitter, generating a carrier offset corrected received signal by applying the carrier offset correction to the received communication signal, and correlating the carrier offset corrected received communication signal with a known sequence.

Another embodiment includes a wireless system. The wireless system includes a plurality of receivers and a plurality of transmitters. Each of the plurality of receivers includes a receiver chain operative to receive a first communication signal from a first transmitter, and a controller operative to determine a carrier offset correction based on prior reception of communication signals from the first transmitter. The receiver chain is operative to generate a first carrier offset corrected received signal by applying the carrier offset correction to the received first communication signal, and a correlation processor is operative to correlate the first carrier offset corrected received communication signal with a known sequence. The plurality of transmitters includes the first transmitter. Each transmitter except the first transmitter adjust a carrier offset to transmit signals of the transmitter to mitigate correlation of its transmit signal with the known sequence of the first communication signal received by the receiver.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for improving receiver performance in the presence of impairments, and variations in carrier frequencies. The disclosed embodiments overcome the aforementioned disadvantages of prior solutions by using a priori information about impairments based on previous communication with devices transmitting the signal of interest. Using the a priori information, efficient/accurate impairment mitigation is achieved, thereby enabling improved reception of signals of interest from a desired transmitter.

Figure 1:
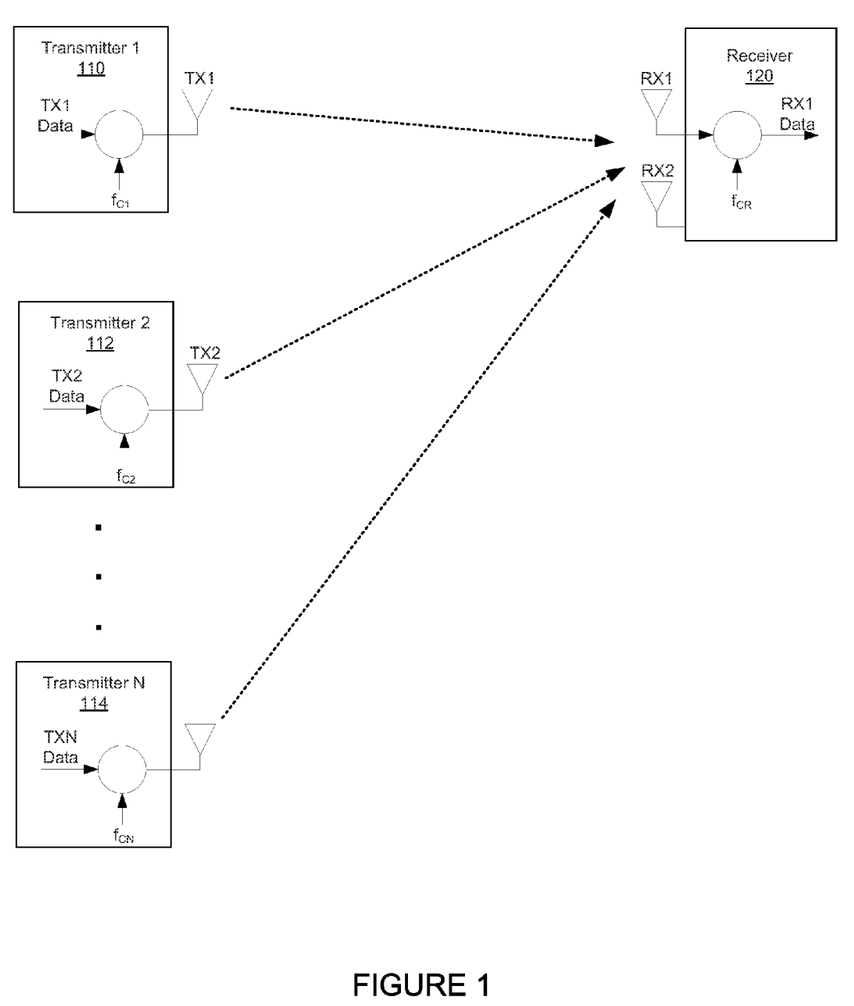
FIG. 1 shows an example multiple transmitters, wherein each transmitter has its own carrier frequency, and a receiver that has its own carrier frequency, according to an embodiment.

FIG. 1 shows an example multiple transmitters, wherein each transmitter 110, 112, 114 has its own carrier frequency, and a receiver 120 that has its own carrier frequency, according to an embodiment. As shown, transmitters 1 through N (110, 112, 114) each include a carrier frequency $f_{C1}$, $f_{C2}$, $f_{CN}$ which can be slighting offset from the carrier frequency $f_{CR}$ of the receiver 120. The differences in the offset frequencies can be due, for example, to clock frequencies of the transmitters 110, 112, 114 being slightly difference than a clock frequency of the receiver 120. Therefore, typically, the carrier frequency $f_{CR}$ of the receiver 120 has an offset frequency relative to the carrier frequencies $f_{C1}$, $f_{C2}$, $f_{CN}$ of the transmitters 110, 112, 114. An absolute value of ($f_{CR}$-$f_{CN}$) is typically within a determinable range.

Wireless signals are typically transmitted in bursts of data denoted as packets. The receiver must first detect the actual start of the packet. For WLAN systems, the transmitted packets contain a preamble at the start of the packet. Since the preamble sequence is known at the receiver, the receiver may correlate the received signal with the known preamble sequence and search for a correlation peak that exceeds a threshold. However, when there is a carrier offset present in the baseband signal due to the clock frequency difference between the transmitter and receiver, the correlation between the received signal and the known preamble sequence is effectively reduced. Thus, due to the inadequate accuracy of the synchronization based on cross-correlation, the receiver may use autocorrelation of the received signal to detect the start of the packet as illustrated in the equations below:

$$\text{Received signal: } y_k = e^{j(\omega_0 k + \varphi)} \left( \sum_{i=0}^{M-1} x_{k-i} h_i + n_k \right) \quad \text{(Eqn. 1)}$$

$$\text{Auto Correlation: } R_{yy} = \sum_{i=0}^{N-1} y_{k+i} y^*_{k+i+L} \quad \text{(Eqn. 2)}$$

$$\text{Signal Square Power: } P_y = \sum_{i=0}^{N-1} |y_{k+i} y^*_{k+i}|^2 \quad \text{(Eqn. 3)}$$

$$\text{Threshold Check: } \frac{|R_{yy}|^2}{P_y} > \gamma_{CS} \quad \text{(Eqn. 4)}$$

where $y_k$ is the received signal at time index k, $x_k$ is the transmitted signal at time index k, $h_{0 \ldots M-1}$ is a length M sequence representing the wireless channel impulse response, $n_k$ is the noise sample at time index k, $\omega_0$ is the carrier offset in radians per sample present in the received signal with respect to the transmitted baseband $s_{0 \ldots N-1}$ is a length N sequence which represents multiple periods of the base L-STF sequence, $R_{yy}$ the autocorrelation of the received signal with a lag of length L, $P_y$ is the squared power of the received signal over the length of the correlation $\gamma_{CS}$ is a threshold used for comparing the against the normalized correlation However, the autocorrelation approach is susceptible to poor detection probability/accuracy in low SNR (Signal to Noise Ratio), severe multipath and interference environments.

Figure 2:
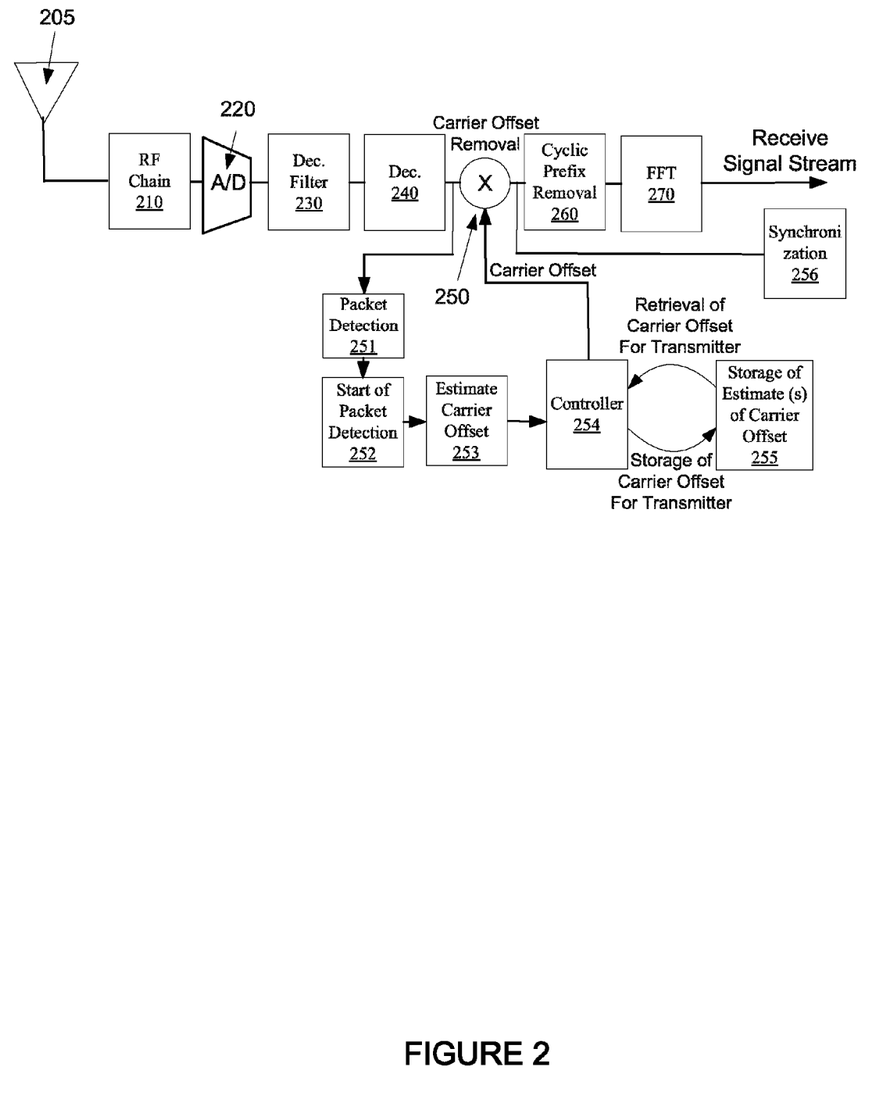
FIG. 2 shows a receiver that includes carrier offset correction of a received signal, according to an embodiment.

FIG. 2 shows a receiver that includes carrier offset correction of a received signal, according to an embodiment. The receiver includes an antenna 205, and RF chain 210 (that includes, for example, frequency down-conversion (coarse frequency down-conversion) of the received signal), an analog-to-digital converter (ADC) 220, a decimation filter 230, and a decimator 240.

For this embodiment, after decimation (240) the carrier offset present in the signal is mitigated by the injection of the negative of an estimate of the carrier offset. Generally, the mixer present in the RF chain provides a coarse frequency down-conversion resulting in a signal with a residual carrier offset which is subsequently estimated and removed in the baseband receiver. For example, mixer 250 removes the estimated carrier offset from the baseband received signal. After mitigation of the carrier offset, the symbol boundaries of the receive signal can more easily be detected. That is, the received signal can more easily be synchronized (256) to by the receiver.

For a received packet prior to a presently received packet, the carrier offset of the received signal is determined (packet detection 251, start of packet detection 252, estimate of carrier offset 253). For embodiments, the carrier offset estimation is performed during the preamble portion of a received packet (for example, the prior packet). Typically, the preamble consists of a periodic signal, in which the contents and periodicity or the periodic signal is known by the receiver. The receiver may perform a correlation of the received signal with a lag (i.e. delay) of N samples of the same signal where N is an integer multiple of the period of the preamble signal. The correlation is performed over a length of L samples. Equation 2 shows an example of the correlation. The angle of the complex valued sum of the correlation divided by the lag, F, provides an estimate of the effective carrier offset or drift per baseband sample.

A controller 254 then stores the determined carrier offset correction for a signal received from a particular transmitter in carrier offset storage 255. For correcting (mitigating), the carrier offset in the present packet, the controller 254 determines which transmitter the receiver is receiving a signal from, and then accesses the previously determined carrier offset correction from the carrier offset storage 255. The retrieved carrier offset correction is then used to mitigate the carrier offset of the presently received packet.

Various embodiments for identifying the desired transmitter can be utilized. That is, various embodiments can be utilized to determine that the received signal was transmitter from the desired transmitter. For an embodiment, a transmission reservation is set up at the MAC layer by the desired transmitter to the receiver and therefore the MAC management entity can communicate this knowledge to the PHY receiving device that the subsequent traffic for a specified time interval is transmitted by the desired transmitter. For a time interval following the reception of the most recent packet, the subsequent packet may be presumed to be transmitted by the same transmitter which transmitted the most recent received packet. If the density of proximate devices is not that high, a pair of devices may communicate on a predetermined channel. Therefore, when the receiving device is set to a particular channel, the receiver may use a lookup table (which is programmable/dynamic) to determine the device which transmits the packets on the current channel.

For an embodiment, once the carrier offset has been estimated, the residual carrier offset is removed from the received signal. The received baseband signal is multiplied (for example, through the use of mixer 250) by a carrier offset removal signal which includes a sine wave that is repeated with a frequency corresponding to the negative of the measured or estimated carrier offset, as depicted in the follow equations 5 and 6.

If the receiver knows a priori the identification of the transmitter device, the receiver can use prior estimate of the carrier offset based on reception of previous packets from that transmitter device. The carrier offset typically varies very slowly over time, mainly due to temperature variations causing clock frequency variation in the transmitters and receivers respectively. Therefore, the carrier offset may be updated over time and maintained per link (i.e. for each device that the receiver is receiving signals from). When the receiver is receiving from a particular device, the corresponding carrier offset estimate can be used and the negative of this carrier offset can be applied to the received signal effectively removing the carrier offset from the signal. Since the carrier offset has been effectively removed, the aforementioned method of cross-correlating the received signal with the known preamble can be used to improve the packet start detection even in low SNRs and interference environments. The equations below illustrate the application of the negative of the carrier offset estimate.

The equations below further illustrate this point:

$$\text{Received signal: } y_k = e^{j(\omega_0 k + \varphi)}\left(\sum_{i=0}^{M-1} x_{k-i} h_i + n_k\right) \quad \text{(Eqn. 5)}$$

$$\text{Cross Correlation: } R_{xy} = \sum_{i=0}^{N-1} y_{k+i} s_i^* e^{-j\hat{\omega} i} \quad \text{(Eqn. 6)}$$

$$\text{Signal Square Power: } P_y = \sum_{i=0}^{N-1} |y_{k+i} s_i^*|^2 \quad \text{(Eqn. 7)}$$

$$\text{Threshold Check: } \frac{|R_{xy}|^2}{P_y} > \gamma_{FS} \quad \text{(Eqn. 8)}$$

where $y_k$ is the received signal at time index k, $x_k$ is the transmitted signal at time index k, $h_{0\ldots M-1}$ is a length M sequence representing the wireless channel impulse response, $\omega_0$ is the carrier offset in radians per sample present in the received signal with respect to the transmitted baseband signal, $n_k$ is the noise sample at time index k, $s_{0\ldots N-1}$ is a length N sequence which represents some subset of the known preamble sequence, $R_{xy}$ is the cross correlation between the received signal and known preamble, $P_y$ is the squared power of the received signal and known preamble signal over the length of the correlation, $\gamma_{FS}$ is a threshold used for comparing the against the normalized correlation, $\hat{\omega}$ is the estimated carrier offset in radians per sample If $\hat{\omega}$ is a reasonable estimate of the actual carrier offset $\omega_0$, then the cross-correlation peak will not be degraded thereby improving the accuracy of start of packet and OFDM symbol boundary detection.

The robustness of this packet detection can be further improved by simultaneous use of the autocorrelation and cross-correlation methods. The correlations from both methods can be used to determine the packet start.

If the received signal is a multi-carrier signal, such as, an OFDM (orthogonal frequency division multiplexing) signal, the packet start detection is also used to establish the OFDM symbol boundary in the received signal. At this point, the receiver needs to estimate the channel. When the carrier offset is solely estimated during reception of the packet, the channel estimation must be delayed until accurate carrier offset computation is completed. This computation results in increased latency at the receiver as well as additional buffering of the received data. However, with a priori carrier offset estimates, the latency can be minimized and channel estimation and the rest of the receiver processing can be accomplished faster.

Figure 3:
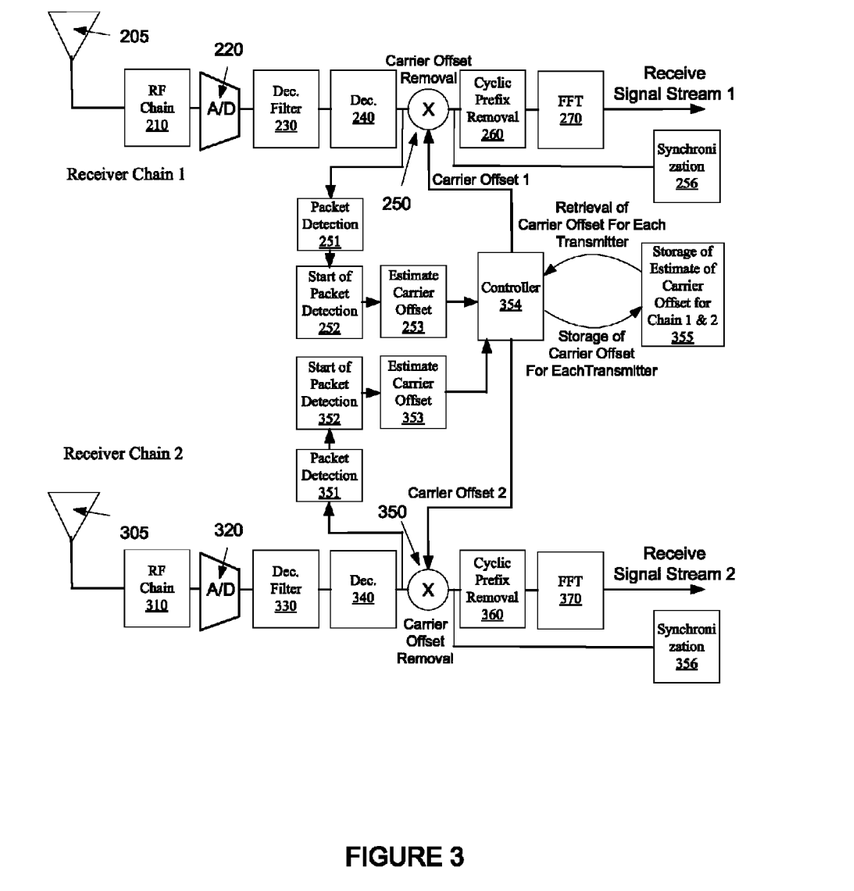
FIG. 3 shows a receiver that includes multiple receiver chains, wherein the receiver generates a carrier offset correction for a receive signal of each of the receiver chains, according to an embodiment.

FIG. 3 shows a receiver that includes multiple receiver chains, wherein the receiver generates a carrier offset correction for a receive signal of each of the receiver chains, according to an embodiment. The multiple receiver chain receiver can be utilized, for example, in multiple-input, multiple-output (MIMO) wireless systems. While only two receiver chains are shown, it is to be understood that the receiver can include any number of receiver chains.

In MIMO systems, the received signals from all receiver chains typically contains the same carrier offset with respect to the transmitted signals since there is typically one clock source for each device. Therefore, the method of utilizing the a priori knowledge of the carrier offset can be applied to the received signals of all receiver chains thereby improving the synchronization robustness of each received signal. (Note: in MIMO signals, the synchronization or packet start detection typically utilizes the correlation information from all receiver chains to improve the overall robustness and detection accuracy).

As shown, a second receiver chain includes an antenna 305, and RF chain 310 (that includes, for example, frequency down-conversion (coarse frequency down-conversion) of the received signal), an analog-to-digital converter (ADC) 320, a decimation filter 330, and a decimator 340.

For this embodiment, after decimation (340) the carrier offset is mitigated by the addition of a carrier offset signal (Carrier Offset 2). Generally, the carrier offset signal provides a fine, or residual frequency down-conversion for adjusting the carrier offset (utilizing, for example, a mixer 350). After mitigation of the carrier offset, the symbol boundaries of the receive signal can more easily be detected. That is, the received signal can more easily be synchronized (356) to by the receiver.

For a received packet prior to a presently received packet, the carrier offset of the received signal is determined (packet detection 351, start of packet detection 352, estimate of carrier offset 353). For embodiments, the carrier offset estimation is performed during the preamble portion of a received packet (for example, the prior packet).

A controller 354 then stores the determined carrier offset correction for a signal received from a particular transmitter in carrier offset storage 355. For correcting (mitigating) the carrier of the present packet, the controller 354 determines which transmitter the receiver is receiving a signal from, and then accesses the previously determined carrier offset correction from the carrier offset storage 355. The retrieved carrier offset correction is then used to mitigate the carrier offset of the presently received packet. While there are two carrier offsets shown in the Figure, offset 1 and offset 2, these values could be the same if the receiver is receiving signals from a single transmitter device. If the receiver is receiving from more than one transmitter, each receiver chain may apply a different carrier offset correction corresponding to previously estimated carrier offsets with respect to different transmitters.

Figure 4:
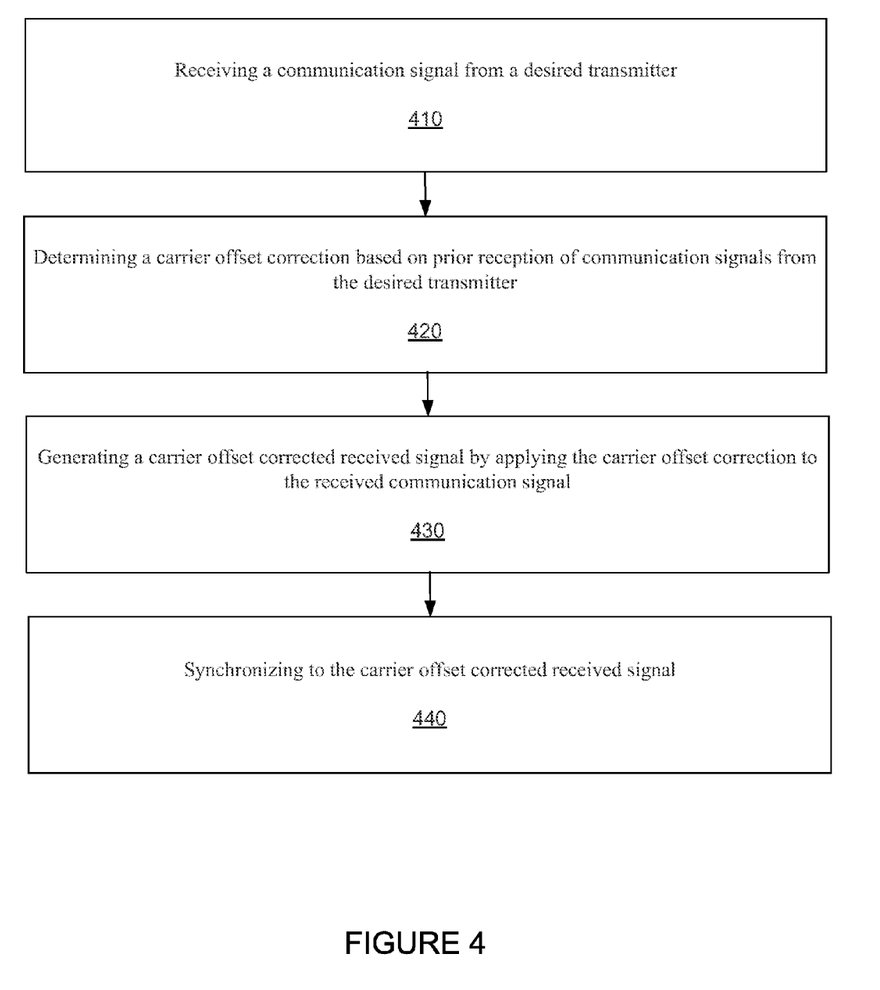
FIG. 4 is a flow chart that includes steps of a method of receiving a wireless signal, according to an embodiment.

FIG. 4 is a flow chart that includes steps of a method of receiving a wireless signal, according to an embodiment. A first step 410 includes receiving a communication signal from a desired transmitter. A second step 420 includes determining a carrier offset correction based on prior reception of communication signals from the transmitter. A third step 430 includes generating a carrier offset corrected received signal by applying the carrier offset correction to the received communication signal. A fourth step 440 includes synchronizing to the carrier offset corrected received signal.

For embodiments, the carrier offset correction for the desired transmitter is determined from prior communication signals received from desired transmitter. The carrier offset correction can be estimated, for example, during the preamble portion of a received packet of the previously receives communication signal of the desired transmitter. Typically, the preamble consists of a periodic signal, wherein the contents and periodicity of the periodic signal is known by the receiver. For an embodiment, the receiver performs a correlation of the received signal with a lag (i.e. delay) of N samples of the same signal where N is an integer multiple of the period of the preamble signal. For embodiments, the correlation is performed over a length of L samples. For embodiments, the angle of the complex valued sum of the correlation is divided by the lag, L, which provides an estimate of the effective carrier offset or drift per baseband sample.

Once the carrier offset has been estimated, this residual carrier offset is removed from the received signal. As described, for embodiments, applying the carrier offset correction to the received communication signal includes multiplying the received signal by the carrier offset signal, wherein the carrier offset signal includes a sine wave that is repeated with a frequency corresponding to the negative of the measured or estimated carrier offset.

For an embodiment, synchronizing to the carrier offset corrected received signal, includes correlating the carrier offset corrected received communication signal with a known sequence. For embodiments, synchronization includes a process of determining the start of a packet and more specifically, in the case of OFDM received signals, the symbol boundary of each OFDM symbol.

An embodiment further includes estimating a carrier offset of a currently received packet of the received communication signal, comparing the estimated carrier offset of the currently received packet with the determined carrier offset correction, and determining that currently received packet is not transmitted from the desired transmitter if a difference between the estimated carrier offset of the currently received packet and determined carrier offset correction is greater than a threshold. Further, embodiments include not acting upon the received signal if determined not to be received from a desired transmitter.

Another embodiment includes estimating a first timing offset of a currently received packet of the received communication signal, computing a second timing offset based on the determined carrier offset correction offset (Note: alternatively, this computation can be based on the determined carrier offset correction based on prior reception of communication signals from the desired transmitter), comparing the estimated first timing offset with the computed second timing offset, and determining that the currently received packet is not transmitted from the desired transmitter if a difference between the estimated first timing offset and the computed second timing offset is greater than a threshold. The computed timing offset may be calculated from the carrier offset correction in the following manner. Typically, the carrier and sampling rate frequencies are derived from the same clock on a transmitter or receiver. Therefore, a numerical relationship exists between the carrier and timing drift from the respective nominal carrier and sampling frequencies. Specifically, the sampling rate deviation or equivalently the timing offset is smaller by a factor of $f_c/f_s$ compared to the carrier offset where $f_c$ corresponds to the nominal carrier frequency of the mixer and $f_s$ corresponds to the nominal sampling rate of the DAC (transmitter) or ADC (receiver).

An embodiment further includes determining which of a plurality of transmitters the receiver is receiving the communication signal from, and accessing a corresponding carrier offset correction based upon the determination of which of the plurality of transmitters the receiver is receiving the communication signal from. As previously described, the determination of which of the plurality of transmitters the receiver is receiving the communication signal from can be determined utilizing various methods. For an embodiment, a transmission reservation is set up at the MAC layer by the desired transmitter to the receiver and therefore the MAC management entity can communicate this knowledge to the PHY receiving device that the subsequent traffic for a specified time interval is transmitted by the desired transmitter. For a time interval following the reception of the most recent packet, the subsequent packet may be presumed to be transmitted by the same transmitter which transmitted the most recent received packet. If the density of proximate devices is not that high, a pair of devices may communicate on a predetermined channel. Therefore, when the receiving device is set to a particular channel, the receiver may use a lookup table (which is programmable/dynamic) to determine the device which transmits the packets on the current channel.

For an embodiment, the communication signal includes a present packet, and the carrier offset correction is determined from a prior packet received within the prior reception from the transmitter. An embodiment includes re-determining the carrier offset correction.

An embodiment further includes receiving a plurality of communication signals through a plurality of receiver chains, wherein each receiver chain includes an antenna. A specific embodiment further includes a first receiver chain of the plurality of receiver chains receiving a first communication signal from a first transmitter, and a second receiver chain of the plurality of receiver chains receiving a second communication signal from a second transmitter, wherein the first receiver chain applies a first carrier offset correction to the first communication signal, and the second receiver chain applies a second carrier offset correction to the second communication signal. A specific embodiment further includes the receiver determining the first carrier offset correction based on previously received first communication signals, and determining the second carrier offset correction based on previously received second communication signals. A specific embodiment further includes the receiver identifying each one of N communication signals received through the plurality of receiver chains, accessing a corresponding one of N carrier offset corrections for each of the N communication signals, and applying the corresponding one of the N carrier offset corrections to each of the received N communication signals. A specific embodiment further includes each one of the N communication signals being received over at least one corresponding receiver chain, wherein the corresponding receiver chain applies a corresponding one of N carrier offset corrections.

When there are more than N devices with which the receiver may be receiving desired signals, embodiments of the receiver decides which N carrier offsets corrections to apply to each of the chains. An embodiment includes choosing the carrier offset corrections corresponding to the N devices that the receiver has been receiving the most traffic/packets over some time period. Another embodiment includes choosing the carrier offset corrections corresponding to the N devices whose packets have been received with the lowest average SNR over some time period. Another embodiment includes determining the minimum and maximum carrier offset correction for all devices which have communicated with the receiver and choose a distribution of N carrier offset corrections such that the resulting minimum residual carrier offset for a packet received from any device (i.e. the minimum of the absolute value of the N differences between the actual carrier offset and the N carrier offset corrections on the N chains) is not greater than some threshold. If this condition is satisfied, the residual carrier offset may be small enough that the cross-correlation peaks are not sufficiently reduced thereby still enabling good synchronization performance.

Figure 5:
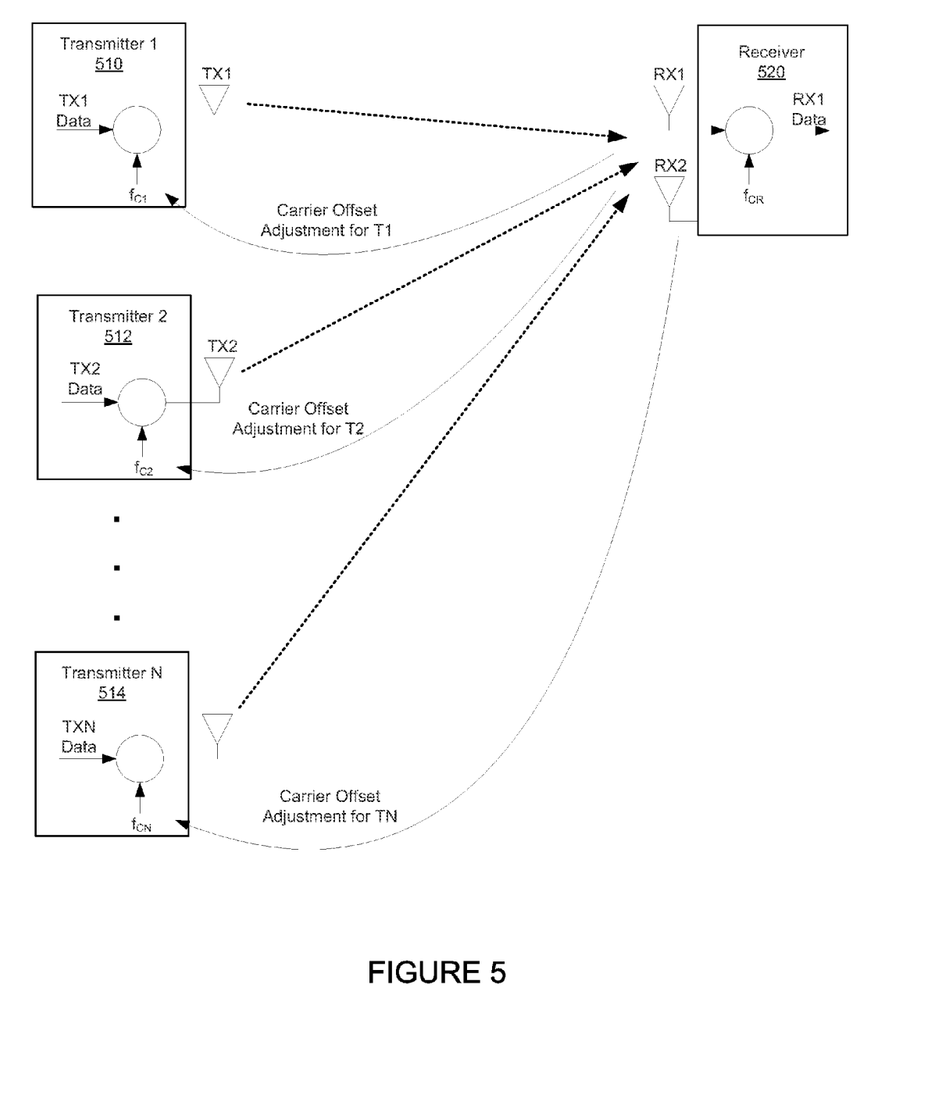
FIG. 5 shows a wireless system that includes multiple transmitters and a receiver, that includes transmitter carrier offset adjustments and a receiver carrier offset correction, according to an embodiment.

FIG. 5 shows a wireless system that includes multiple transmitters 510, 512, 514 and a receiver 520, that includes transmitter carrier offset adjustments and a receiver carrier offset correction. As shown, the receiver 520 provides a carrier offset adjustment for each of the transmitters 510, 512, 514. The carrier offset adjustments for the transmitters 510, 512, 514 can be selected to improve the carrier offset of the desired one of the transmitters, and can alternatively or additionally be selected to reduce interfering properties of the transmitters that are not intended for reception by the receiver 520.

As previously described, the multiple receiver chains of the receiver 520 can be utilized to receive communications signals from multiple transmitters, wherein each chain receives communication signals from a specific transmitter, and correspondingly, selects a carrier offset correction that corresponds with that specific transmitter. For this embodiment, each receiver chain of a multiple chain receiver is optimized to receive a signal from a different device. If there are N receive chains, each of the received signals could be processed with carrier offset removal based on a different a priori carrier offset estimate corresponding to up to N different transmit devices. Upon start of packet detection by a particular receiver chain, all receiver chains could then apply the carrier offset estimate used for carrier offset removal by that receiver chain which detected a start of packet.

Further, carrier offset adjustments can be provided to multiple transmitters for the purposes of reducing the interference caused by transmitters that the receiver is not receiving communications signals from. The improved interference mitigation using this technique can be illustrated with an example. Assume that there are two transmit devices in the proximity of a receiver. The transmit device transmitting the desired signal to the receiver has a carrier frequency denoted as $f_D$ and the transmit device transmitting the interference signal has a carrier denoted as $f_I$. The receiver has a carrier frequency denoted as $f_R$. The interferer may adjust its carrier $f_I$ such that the following equation is satisfied:

Received interference signal: $y_k = e^{j(\omega_I k + \phi)} (\sum_{j=0}^{M-1} x_{k-j} h_j + n_k)$ (Eqn. 9)

Estimated interference carrier: $\widehat{\omega}_I = {}_{\omega_I} \max_k |\sum_{i=0}^{N-1} y_{k+i} s_i^* e^{-j\hat{\omega}i}|$ (Eqn. 10)

$\hat{\omega}$ is the estimated carrier offset between the transmitter of the desired signal and the receiver in radians per sample $\omega_I$ represents a candidate value (in some allowable range) for the carrier offset between the interferer and the receiver in radians per sample $\widehat{\omega}_I$ is the chosen optimum carrier offset between the interferer and receiver in radians per sample from the set of candidate values Thus, $f_I = f_R + f_s \widehat{\omega}_I / 2\pi$, where $f_s$ is the sampling rate of the baseband signal at the receiver in samples/sec. The above optimization may be performed at the receiver and communicated to the interferer. Alternatively, the interferer could receive signals sent between the transmitter and receiver and derive the optimum carrier offset by using similar processing to that shown above.

The aforementioned approach for selecting a carrier to mitigate interference could be extended to a network of many devices. Each receiving device could determine the set of all transmitters whose signals arrive at the receiver with signal strength above a threshold. If the receiver determines that some of those signals are being transmitted by interferers, the receiver could communicate a recommended carrier value to be used by each interferer. Each interfering device could then adjust its carrier to that value. For a high density of devices, a central controller could determine the best carrier values to be used by all devices in the network based on knowledge of approximate location of the various devices as well as the desired signals to be received by each device.

OTHER EMBODIMENTS

Analogous to the use of carrier offset, a priori estimates of noise/interference profiles (for example, a noise/interference power estimate per OFDM tone) may be utilized to improve the detection/decoding of the received signal. For example, if the noise profile indicates power on certain tones above a threshold, the synchronization may resort to only using the cross-correlation approach for detecting start of packet rather than the autocorrelation approach. Additionally, the carrier offset estimation itself may be implemented only using the tones with noise power below a threshold (since the high noise power may corrupt the carrier offset estimate thereby degrading performance for current as well as subsequent packets if the estimate is used in subsequent packets as an a priori estimate).

Although specific embodiments have been described and illustrated, the embodiments are not to be limited to the specific forms or arrangements of parts so described and illustrated. The described embodiments are to only be limited by the claims.

What is claimed:

1. A receiver, comprising:
    a controller operative to determine that a communication signal being received is from a desired transmitter;
    the controller operative to determine a carrier offset correction based on prior reception of communication signals from the desired transmitter, comprising retrieving a carrier offset of the desired transmitter from one or more stored carrier offsets based on previous communication with the desired transmitter;
    a receiver chain operative to receive the communication signal from the desired transmitter;
    the receiver chain operative to generate a carrier offset corrected received signal based on the retrieved carrier offset by applying the carrier offset correction to the received communication signal; and
    the receiver operative to synchronize to the carrier offset corrected received communication signal.

2. The receiver of claim 1, wherein the receiver being operative to synchronize to the carrier offset corrected received communication signal comprises a correlation processor being operative to correlate the carrier offset corrected received communication signal with a known sequence.

3. The receiver of claim 1, wherein the communication signal includes a present packet, and wherein the one or more stored carrier offsets were determined from one or more prior packets received within prior reception from the desired transmitter.

4. The receiver of claim 1, wherein the receiver further comprises a plurality of receiver chains, wherein each receiver chain includes an antenna.

5. The receiver of claim 4, further comprising a first receiver chain of the plurality of receiver chains receiving the communication signal from the desired transmitter, and a second receiver chain of the plurality of receiver chains receiving a second communication signal from a second transmitter, wherein the first receiver chain applies the carrier offset correction to the communication signal, and the second receiver chain applies a second carrier offset correction to the second communication signal, wherein the second carrier offset correction is based on retrieving a second carrier offset from one or more stored second carrier offsets based on previous communication with the second transmitter.

6. The receiver of claim 5, determine the second carrier offset correction based on previously received second communication signals.

7. The receiver of claim 4, further comprising the receiver identifying each one of N communication signals received through the plurality of receiver chains, accessing a corresponding one of N carrier offset corrections for each of the N communication signals, and applying the corresponding one of the N carrier offset corrections to each of the received N communication signals.

8. The receiver of claim 7, wherein each one of the N communication signals is received over at least one corresponding receiver chain, wherein the corresponding receiver chain applies a corresponding one of the N carrier offset corrections.

9. The receiver of claim 1, wherein the controller is further operative to re-determine the carrier offset correction.

10. The receiver of claim 1, wherein the controller operative to determine that received communication signal is from the desired transmitter comprises a PHY (physical) layer of the receiver receiving notification from a MAC (media access control) layer that subsequent received traffic is expected from the desired transmitter.

11. The receiver of claim 1, wherein the controller operative to determine that received communication signal is from the desired transmitter comprises the controller accessing a lookup table based on a current channel to determine the desired transmitter from which the communication signal is being received.

12. The method of claim 1, wherein the one or more stored carrier offsets comprise one or more carrier offset corrections.

13. A receiver, comprising:
a receiver chain operative to receive a communication signal from a desired transmitter;
a controller operative to determine a carrier offset correction based on prior reception of communication signals from the desired transmitter;
the receiver chain operative to generate a carrier offset corrected received signal by applying the carrier offset correction to the received communication signal;
the receiver operative to synchronize to the carrier offset corrected received communication signal; wherein
the controller is further operative to:
estimate a carrier offset of a currently received packet of the carrier offset corrected received communication signal;
compare the estimated carrier offset of the currently received packet with the carrier offset correction; and
determine that the currently received packet is not transmitted from the desired transmitter if an absolute value of a difference between the estimated carrier offset of the currently received packet and carrier offset correction is greater than a threshold.

14. A receiver, comprising:
a receiver chain operative to receive a communication signal from a desired transmitter;
a controller operative to determine a carrier offset correction based on prior reception of communication signals from the desired transmitter;
the receiver chain operative to generate a carrier offset corrected received signal by applying the carrier offset correction to the received communication signal;
the receiver operative to synchronize to the carrier offset corrected received communication signal; wherein
the controller is further operative to:
estimate a first timing offset of a currently received packet of the received communication signal;
compute a second timing offset based on the determined carrier offset correction;
compare the estimated first timing offset with the computed second timing offset; and
determine that the currently received packet is not transmitted from the desired transmitter if an absolute value of a difference between the estimated first timing offset and the computed second timing offset is greater than a threshold.

15. A wireless system comprising:
a receiver, the receiver including:
a receiver chain operative to receive a first communication signal from a first transmitter;
a controller operative to determine a carrier offset correction based on prior reception of communication signals from the first transmitter;
the receiver chain operative to generate a first carrier offset corrected received signal by applying the carrier offset correction to the received first communication signal; and
a correlation processor operative to correlate the first carrier offset corrected received communication signal with a known sequence;
a plurality of transmitters including the first transmitter, each transmitter except the first transmitter adjusting a carrier offset to transmit signals of the transmitter to mitigate correlation of its transmit signals with the known sequence of the first communication signal received by the receiver.

16. The wireless system of claim 15, wherein the controller is further operative to determine which of a plurality of transmitters the receiver is receiving the communication signal from, and accessing a corresponding carrier offset correction based upon the determination of which of the plurality of transmitters the receiver is receiving the communication signal from.

17. A method of receiving a wireless signal, comprising:
determining that a communication signal being received is from a desired transmitter;
determining a carrier offset correction based on prior reception of communication signals from the desired transmitter, comprising retrieving a carrier offset of the desired transmitter from one or more stored carrier offsets based on previous communication with the desired transmitter;
receiving the communication signal from the desired transmitter;
generating a carrier offset corrected received signal based on the retrieved carrier offset by applying the carrier offset correction to the received communication signal; and
synchronizing to the carrier offset corrected received communication signal.

18. The method of claim 17, further comprising:
estimating a carrier offset of a currently received packet of the received communication signal;
comparing the estimated carrier offset of the currently received packet with the carrier offset correction; and
determining that the currently received packet is not transmitted from the desired transmitter if an absolute value of a difference between the estimated carrier offset of the currently received packet and carrier offset correction is greater than a threshold.

19. The method of claim 17, further comprising:
estimating a first timing offset of a currently received packet of the received communication signal;
computing a second timing offset based on the determined carrier offset correction offset;
comparing the estimated first timing offset with the computed second timing offset; and
determining that the currently received packet is not transmitted from the desired transmitter if an absolute value of a difference between the estimated first timing offset and the computed second timing offset is greater than a threshold.

20. The method of claim 17, further comprising receiving a plurality of communication signals through a plurality of receiver chains, wherein each receiver chain includes an antenna.

21. The method of claim 20, further comprising a first receiver chain of the plurality of receiver chains receiving a first communication signal from a first transmitter, and a second receiver chain of the plurality of receiver chains receiving a second communication signal from a second transmitter, wherein the first receiver chain applies a first carrier offset correction to the first communication signal, and the second receiver chain applies a second carrier offset correction to the second communication signal wherein the second carrier offset correction is based on retrieving a second carrier offset from one or more stored second carrier offsets based on previous communication with the second transmitter.

22. The method of claim 21, the receiver determining the first carrier offset correction based on previously received first communication signals, and determining the second carrier offset correction based on previously received second communication signals.

23. The method of claim 22, further comprising the receiver identifying each one of N communication signals received through the plurality of receiver chains, accessing a corresponding one of N carrier offset corrections for each of the N communication signals, and applying the corresponding one of the N carrier offset corrections to each of the received N communication signals.

24. A method, comprising:
receiving a communication signal from a desired transmitter;
determining a carrier offset correction based on prior reception of communication signals from the desired transmitter;
generating a carrier offset corrected received signal by applying the carrier offset correction to the received communication signal;
synchronizing to the carrier offset corrected received communication signal;
estimating a timing offset of a currently received packet of the received communication signal;
computing a timing offset based on the determined carrier offset correction offset;
comparing the estimated timing offset with the computed timing offset; and
determining that the currently received packet is not transmitted from the desired transmitter if a difference between the estimated timing offset and the computed timing offset is greater than a threshold.

25. A receiver, comprising:
a receiver chain operative to receive a communication signal from a desired transmitter;
a controller operative to:
determine a carrier offset correction based on prior reception of communication signals from the desired transmitter;
estimate a carrier offset correction of a currently received packet of the carrier offset corrected received communication signal;
compare the estimated carrier offset correction of the currently received packet with the carrier offset correction; and
determine that the currently received packet is not transmitted from the desired transmitter if an absolute value of a difference between the estimated carrier offset correction of the currently received packet and carrier offset correction is greater than a threshold.

26. A receiver, comprising:
a receiver chain operative to receive a communication signal from a desired transmitter;
a controller operative to:
determine a carrier offset correction based on prior reception of communication signals from the desired transmitter;
estimate a first timing offset of a currently received packet of the received communication signal;
compute a second timing offset based on the determined carrier offset correction;
compare the estimated first timing offset with the computed second timing offset; and
determine that the currently received packet is not transmitted from the desired transmitter if an absolute value of a difference between the estimated first timing offset and the computed second timing offset is greater than a threshold.

* * * * *